United States Patent
Bhattacharjee et al.

(10) Patent No.: US 7,685,181 B2
(45) Date of Patent: Mar. 23, 2010

(54) METHOD AND SYSTEM FOR UTILIZING A HIERARCHICAL BITMAP STRUCTURE TO PROVIDE A FAST AND RELIABLE MECHANISM TO REPRESENT LARGE DELETED DATA SETS IN RELATIONAL DATABASES

(75) Inventors: Bishwaranjan Bhattacharjee, Yorktown Heights, NY (US); Timothy Ray Malkemus, Leander, TX (US); Sean W. McKeough, Markham (CA); Jo-anne Mona Louise Kirton, Toronto (CA); Sherman Lau, Markham (CA)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/679,076

(22) Filed: Feb. 26, 2007

(65) Prior Publication Data

US 2008/0208802 A1     Aug. 28, 2008

(51) Int. Cl.
*G06F 17/30* (2006.01)
*G06F 17/00* (2006.01)
*G06F 13/28* (2006.01)
*G06F 13/00* (2006.01)

(52) U.S. Cl. .................. 707/206; 711/122; 711/162
(58) Field of Classification Search .................. 707/206
See application file for complete search history.

(56) References Cited

U.S. PATENT DOCUMENTS

| 5,442,758 | A | 8/1995 | Slingwine et al. |
| 5,504,889 | A | 4/1996 | Burgess |
| 5,784,699 | A * | 7/1998 | McMahon et al. ........... 711/171 |
| 5,813,000 | A * | 9/1998 | Furlani ........................... 707/3 |
| 6,175,900 | B1 | 1/2001 | Forin |
| 6,272,033 | B1 * | 8/2001 | Watt ............................ 365/49.1 |
| 6,292,795 | B1 * | 9/2001 | Peters et al. ..................... 707/3 |
| 6,427,147 | B1 * | 7/2002 | Marquis .......................... 707/4 |
| 6,510,504 | B2 * | 1/2003 | Satyanarayanan ............ 711/170 |

(Continued)

OTHER PUBLICATIONS

Timo Lilja, Riku Saikkonen, Seppo Sippu, Eljas Soisalon-Soininen. "Online Bulk Deletion". Feb. 7th, 2007. IEEE 23$^{rd}$ International Conference on Data.*

(Continued)

*Primary Examiner*—Neveen Abel Jalil
*Assistant Examiner*—Polina Peach
(74) *Attorney, Agent, or Firm*—Scully, Scott, Murphy & Presser, P.C.; Preston Young, Esq.

(57) ABSTRACT

A method and system utilizes a hierarchical bitmap structure to represent deleted data sets. Each level in the hierarchical bitmap structure may have progressively larger size and represent finer granularity of number of data blocks than its parent level. A method in one aspect may comprise allocating a first level bitmap having size equal to a register on a processor, each bit in the first level bitmap representing a plurality of blocks of data in a database, and allocating one or more pointers corresponding to said plurality of bits in the first level bitmap, said one or more pointers being allocated to point to a sub bitmap generated after a data block is deleted but before the index corresponding to the data block is cleaned.

6 Claims, 2 Drawing Sheets

U.S. PATENT DOCUMENTS

| | | |
|---|---|---|
| 6,609,088 B1 * | 8/2003 | Wuytack et al. ............... 703/22 |
| 6,636,879 B1 * | 10/2003 | Doucette et al. ............ 707/205 |
| 6,640,290 B1 | 10/2003 | Forin |
| 6,658,619 B1 | 12/2003 | Chen |
| 6,778,501 B1 * | 8/2004 | Malmgren et al. .......... 370/236 |
| 6,874,062 B1 | 3/2005 | Goldberg |
| 6,886,162 B1 | 4/2005 | McKenney |
| 6,937,611 B1 | 8/2005 | Ward |
| 7,401,093 B1 * | 7/2008 | Hamilton et al. ............ 707/102 |
| 2001/0018731 A1 * | 8/2001 | Fujii et al. .................. 711/170 |
| 2004/0024729 A1 * | 2/2004 | Worley .......................... 707/1 |
| 2005/0036494 A1 | 2/2005 | Goryavsky |
| 2005/0144202 A1 * | 6/2005 | Chen .......................... 707/205 |
| 2005/0207353 A1 | 9/2005 | Goryavsky |
| 2006/0034277 A1 | 2/2006 | Jang et al. |
| 2007/0094287 A1 * | 4/2007 | Wang ......................... 707/101 |

OTHER PUBLICATIONS

"*Performance Study of Rollout for Multi Dimensional Clustered Tables in DB2*" was published at the First ACM International Workshop on Performance and Evaluation of Data Management Systems (EXPDB) Jun., 2006 at Chicago.

"*Efficient Deletes in Relational Databases*" was published at the 17th International Conference of Data Engineering (ICDE) held in Germany in Apr. 2001.

* cited by examiner

METHOD AND SYSTEM FOR UTILIZING A HIERARCHICAL BITMAP STRUCTURE TO PROVIDE A FAST AND RELIABLE MECHANISM TO REPRESENT LARGE DELETED DATA SETS IN RELATIONAL DATABASES

CROSS-REFERENCE TO RELATED APPLICATIONS

This application is related to U.S. patent application Ser. No. 11/412,554, filed Apr. 27, 2006 and U.S. patent application Ser. No. 11/278,125, filed on Mar. 30, 2006, both of which applications are assigned to the same assignee in the present application, and incorporated herein by reference thereto in their entirety.

FIELD OF THE INVENTION

The present disclosure is related to data warehousing and databases, and more particularly to representing and managing deleted data in databases.

BACKGROUND OF THE INVENTION

Data warehouse sizes have been growing in leaps and bounds. An important concern is the storage costs associated with it. This is addressed by the periodic archiving of old data, which might be accessed less often or by its summary removal from the database when not needed. Both methods require the mass delete of data from the warehouse. This is also known as Rollout or as Bulk Delete. The space thus freed up is used to make way for new data that is available. For example, a company might have a warehouse of five years of data. At the end of every month it might delete the oldest month of data and bring in data for the latest month.

In the past, such mass deletes were usually performed in a maintenance window when the system load was low such as after midnight. Recent trends indicate users are moving towards a shorter time frame to perform this type of maintenance activities. Customers want their systems to be available all the time, non-stop, even for a warehouse. Also, the amount of data being rolled out is becoming smaller but it is being done more frequently. These factors make an efficient online rollout mechanism very important for a database engine. The efficiency can be measured by various parameters, like, response time of a rollout, the amount of log space used, the number of locks required, the response time of a rollback of the rollout, how quickly the space freed can be reused and what kind of concurrent access to the table is allowed when the rollout is going on.

The conventional delete mechanism employed by database engines generally works horizontally, on a record at a time. In this a record is deleted and the defined indexes are updated one by one to reflect the delete of that record. An example of this is seen in DB2 UDB V7. For mass or multiple record deletes, one iterates over all records to be deleted in a similar fashion. A delete of a record entails logging the activity in a log file and then doing the physical delete from the table. If one has indexes defined on the table then each index update has to be logged and its structure changed to reflect the delete. The index updates are very costly and even if there are only a few defined, they could overwhelmingly dominate the total cost of the delete. Existing works such as "Efficient Bulk Deletes in Relational Databases" ICDE 2001 and "Performance Study of Rollout for Multi Dimensional Clustered Tables in DB2" in EXPDB 2006 show such increase in cost. For example, the latter reports that the response time for a delete jumping from 15 seconds when there were no rid indexes (record-based indexes) on the table to 826 seconds when one index on partkey column was included. The cost of updating the rid index was approx 811 seconds and it dwarfs all others costs.

If the data in the table is clustered and bucketized on some columns or a function of some columns, such that all records in a bucket or cell are of the same value for that column or its function, one could optimize the delete with conditions on these columns by logging the entire delete of the bucket one time only but logging any indexes individually for each record. Consider a table whose logical view is shown in the left cube 102 of FIG. 1. It has data bucketized and clustered on nation, year and itemid. An example rollout on this table is shown in right 104 of FIG. 1. Here a delete happened with conditions on columns year (value 1992) and itemid (value 1), which results in entire buckets being dropped. What is shown at 104 of FIG. 1 is the resultant logical view of the data after the delete. This method is described in "Performance Study of Rollout for Multi Dimensional Clustered Tables in DB2." While this tactic provides some relief, improved method may be desirable when there are a large number of rid indexes (record-based indexes) defined on the table that needs to be updated.

One could have buckets in a table as described previously and have indexes defined on those individual buckets rather than the entire table. So if there are 100 buckets there may be 100 individual indexes defined on these buckets rather than one index for the entire table. In such a case when one deletes a bucket, one could mark the entire bucket and its "local" index as deleted as one log event and save a lot of response time. But having these types of indexes (known as local indexes) has their own limitations and is not always ideal in all cases.

For a table partitioned into a huge number of small buckets, an improved method may be desirable. For example, DB2 supports a feature called Multi Dimensional Clustering (MDC), which allows a table to have as much as (2^31) buckets.

Tandem Non-Stop SQL attempts to solve the problem of updating rid indexes by doing the update of multiple indexes in parallel rather than one after the other. A mechanism for bulk deletes is explained in Gartner, A., Kemper, A., Kossman, D., Zeller, B., "Efficient Bulk Deletes in Relational Databases", Proceedings of the ICDE 2001. The method described, is based on vertical deletes of the base table and any rid indexes defined on it. This is to be contrasted with the conventional method of deleting the table record and updating the rid indexes iteratively for all qualifying records.

U.S. Patent Publication No. 2006/0034277 is a method for reporting reception result of packets in mobile communication system. The publication discloses a bitmap structure, which enables the size of a bitmap field containing reception result information to be significantly reduced while fully performing its acknowledgment function. This patent application describes a bitmap scheme for the communication industry.

U.S. Patent Publication No. 2005/0207353 describes distribution of identifiers in serverless networks. The method may be useful in and applied to serverless telephony systems. It details a description of a hierarchical bitmap and its specific use. U.S. Patent Publication No. 2005/0036494 describes distribution of identifiers in serverless networks, similar to above for serverless telephony systems.

U.S. Pat. No. 6,658,619 describes systems and methods for implementing hierarchical acknowledgement bitmaps in an ARQ protocol. U.S. Pat. No. 6,937,611 describes a mechanism for efficient scheduling of communication flows. A system for servicing communication queues described in that patent may include memory configured to store a hierarchical channel map having a plurality of levels wherein each bit of the lowest level is mapped to a different one of a plurality of communication channels and wherein each bit of each higher level is mapped to a group of bits at the next lower level. The system may include a host adapter configured to maintain the hierarchical bitmap wherein each bit at the lowest level is set if the channel to which it is mapped has a pending communication request and is cleared if not. Each bit of each higher level is set if at least one bit is set in the lower level group to which is mapped and cleared if not. The host adapter may be configured to examine the hierarchical bitmap in order to determine a next one of the communication channels to service. At each level of the hierarchical channel map a service mask may be provided to track which bits have already been traversed at that level. Multiple such service masks may be provided at each level to support different service classes.

U.S. Pat. No. 5,442,758 describes apparatus and method for achieving reduced overhead mutual exclusion and maintaining coherency in a multiprocessor system utilizing execution history and thread monitoring. It describes a mutual-exclusion apparatus for maintaining data coherency while concurrently reading and updating a current generation data element, which could use a hierarchical bitmap.

U.S. Pat. No. 6,175,900 describes hierarchical bitmap-based memory manager. A hierarchical bitmap-based memory manager maintains a hierarchical bitmap having an entry for each memory block in a memory heap. Each bitmap entry contains a multi-bit value that represents an allocation state of the corresponding memory block. The memory manager manages allocation, deallocation, and reallocation of the memory blocks, and tracks the changes in allocation state via the hierarchical bitmap. Using a two-bit value, the bitmap can represent at most four different allocation states of the corresponding memory block, including a "free" state, a "sub-allocated" state in which the corresponding memory block is itself an allocated set of smaller memory blocks, a "continue" state in which the corresponding memory block is allocated and part of, but not last in, a larger allocation of plural blocks, and a "last" state in which the corresponding memory block is allocated and last in an allocation of one or more memory blocks.

U.S. Pat. No. 6,640,290 describes easily coalesced, sub-allocating, hierarchical, multi-bit bitmap-based memory manager. A hierarchical bitmap-based memory manager maintains a hierarchical bitmap having an entry for each memory block in a memory heap. Each bitmap entry contains a multi-bit value that represents an allocation state of the corresponding memory block. The memory manager manages allocation, deallocation, and reallocation of the memory blocks, and tracks the changes in allocation state via the hierarchical bitmap. Using a-two-bit value, the bitmap can represent at most four different allocation states of the corresponding memory block, including a "free" state, a "sub-allocated" state in which the corresponding memory block is itself an allocated set of smaller memory blocks, a "continue" state in which the corresponding memory block is allocated and part of, but not last in, a larger allocation of plural blocks, and a "last" state in which the corresponding memory block is allocated and last in an allocation of one or more memory blocks.

U.S. Pat. No. 6,874,062 describes system and method for utilizing a hierarchical bitmap structure for locating a set of contiguous ordered search items having a common attribute Application. A system and method is provided for locating, within a set of ordered items, N contiguous items having a desired attribute. The system utilizes a hierarchical bitmap structure.

U.S. Pat. No. 6,886,162 describes high-speed methods for maintaining a summary of thread activity for multiprocessor computer systems A high-speed method for maintaining a summary of thread activity reduces the number of remote-memory operations for an n processor, multiple node computer system from $n^2$ to $(2n-1)$ operations. The method uses a hierarchical summary of-thread-activity data structure that includes structures such as first and second level bit masks. The first level bit mask is accessible to all nodes and contains a bit per node, the bit indicating whether the corresponding node contains a processor that has not yet passed through a quiescent state.

U.S. Pat. No. 5,504,889 describes a method and system for monitoring attributes of files, such as whether a file has been read, in a computer system includes a file index organized into groups, with at least one group including one or more files. This is done using a hierarchical bitmap structure.

Performance Study of Rollout for Multi Dimensional Clustered Tables in DB2, which appeared in EXPDB 2006 relates to bulk deletes. Efficient Bulk Deletes in Relational Databases, ICDE 2001 describes vertical deletes (in contrast to the conventional horizontal delete).

BRIEF SUMMARY OF THE INVENTION

A method and system that utilizes a hierarchical bitmap structure to represent deleted data sets is provided. The method in one aspect may include but not limited to allocating a first level bitmap having size equal to a register on a processor, each bit in the first level bitmap representing a plurality of blocks of data in a database, and allocating one or more pointers corresponding to said plurality of bits in the first level bitmap, said one or more pointers being allocated to point to a sub bitmap generated after a data block is deleted but before the index corresponding to the data block is cleaned.

A method for utilizing a hierarchical bitmap structure to represent deleted data in databases in another aspect may include but not limited to allocating a first level bitmap having size equal to a register on a processor, each bit in the first level bitmap representing a plurality of blocks of data in a database; allocating a second level bitmap, said each bit in the first level bitmap corresponding to a plurality of bits in the second level bitmap; allocating one or more pointers corresponding to said plurality of bits in the second level bitmap, said one or more pointers being allocated to point to a sub bitmap generated after a data block is deleted but before the index corresponding to the data block is cleaned. In one aspect, the sizes of subsequent or lower levels in the bitmap hierarchy may be tailored to the sizes of memory hierarchy elements on a machine such as data caches.

A system that utilizes a hierarchical bitmap structure to represent deleted data sets in one aspect may include a plurality of bitmaps arranged in a hierarchy, each level of bitmaps in the hierarchy includes a plurality of bits corresponding to one or more blocks of data. A level of bitmap in the hierarchy has bits representing a finer granularity of number of data blocks than bits in its parent level. The top most bitmap level may have size that corresponds to the size of a register of a machine in which the hierarchical bitmap structure is implemented. The system may also include a processor operable to generate a sub bitmap when a data block is deleted that corresponds to the sub bitmap. The processor may be further operable to turn on a bit corresponding to the data block in said each level of bitmaps. The processor may be further operable to query whether a second data block is deleted by evaluating a bit representing said second data block in one or more levels of bitmaps, for example, starting from the top most level in the hierarchy.

Further features as well as the structure and operation of various embodiments are described in detail below with reference to the accompanying drawings. In the drawings, like reference numbers indicate identical or functionally similar elements.

DETAILED DESCRIPTION

Figure 1:
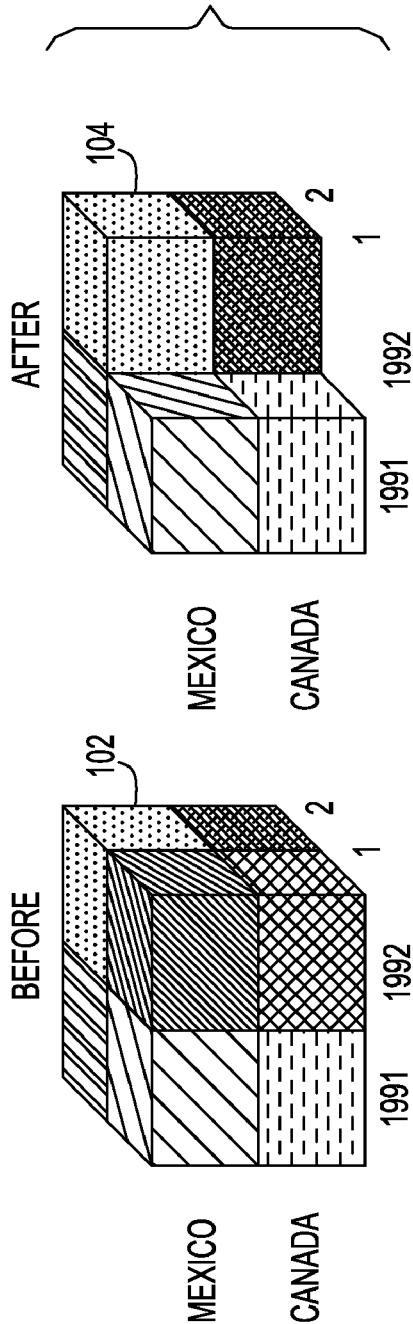
FIG. 1 shows examples of rollouts on bucketized data.
Figure 2:
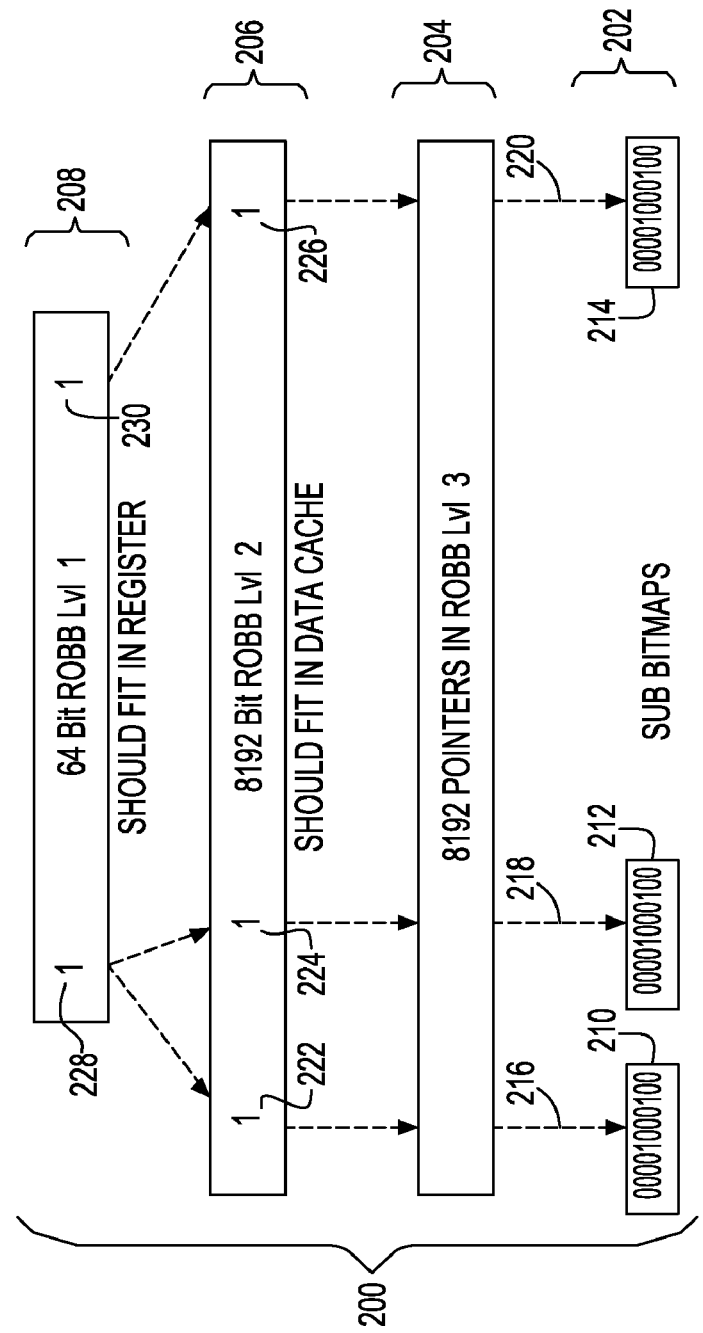
FIG. 2 shows an example of a hierarchical bitmap used in method and system of the present disclosure in one embodiment.

A method and system that utilizes a hierarchical bitmap structure provides a fast, reliable and practical scheme to represent deleted data sets. Hierarchical bitmaps generally refer to a set of bitmaps of different properties being used to tackle a problem. In one embodiment, the hierarchical bitmap used may be machine architecture sensitive and may be designed to exploit the explicit memory hierarchy that one sees in machines with very fast registers, slightly slower caches and then regular memory. This makes for efficient access for queries, which use it and may be also designed to generally take up lower amount of space A hierarchical bitmap in an exemplary embodiment comprises multiple levels. Each level may be of size, which may fit in a level of the memory hierarchy of the machine. For example the top most level may be of n bits and may be such that it fits a register, that is, for example, a size of a register. Registers are generally of sizes 32, 64 or 128 bits. Older machines had smaller registers and the newer ones have larger register sizes. The next level of the bitmap may be of size m bits and may be such that it fits in the data cache of the machine. Machines could have multiple levels of the data cache like L1, L2, L3, etc., and there may be levels of the bitmap corresponding to one or some or all of the multiple levels of the data cache. The lowest level of the bitmap may fit in main memory. FIG. 2 shows an example hierarchical bitmap 200 with four levels. An example value of n and m in this case may be 64 and 8126. It may designed so that level 1 fits in a 64 bit register, level 2 in a data cache like L1 or L2, level 3 in a data cache of level L3 and level 4 may be in main memory.

Consider an example in which a table has a possible x number of buckets. In the case of MDC (Multi Dimensional Clustering) it could be (2^31). The lowest level 202 (marked sub bitmaps in FIG. 2) may have m sub bitmaps each of round ((x/m)+0.5) bits. Every bucket in the table may have one bit space reserved for it in the lowest level 202. The sub bitmap where it belongs to may exist if any one of the blocks corresponding to a bit in it has been deleted and its bit is thus marked 1. In the above example shown in FIG. 2, there are three sub bitmaps 210, 212, 214 materialized out of the in possible sub bitmaps. Each of them is shown to have 2 bits turned to 1. This means there are a total of 6 buckets deleted. The level above that (marked RobbLvl3) 204 may have m pointers to the sub bitmaps. They may be non NULL (not 0) if the bitmap it points to exists. In the above example, there are three pointers 216, 218, 220 which are not NULL. The levels above that (Robb Lvl2) 206 may have a bitmap of size m where there may be a one in a bit of position b if the pointer in the level below of that same number is non NULL. In this case there is three bits 222, 224, 226 marked 1. The topmost level (marked RobbLvl1) 208 may have a bit s turned on if any of the bits ((s−1)*round((m/n)+0.5)) to (s*round((m/n)+0.5))−1 of the level lower to it is on. In the example described in FIG. 2, there are two bits 228, 230 turned on in the top most level. The one on the left 228 has two bits of the lower level 222, 224 corresponding to it turned on and one to the right 230 has one 226.

In this representation, each bit in the topmost level (marked RobbLvl1) 208 represents x/n buckets or blocks, given that the size of the top most level is n and there are x buckets or blocks of data. The next level 206 represents a finer level of granularity, for example, each bit in the next level 206 represent x/m buckets or blocks where that m is greater than n. The hierarchy may comprise any number of levels in similar manner depending on the design and system considerations. Thus, in this representation, a bit in the top level 208 represents a number of bits in the next lower level 206. If any one of the bits in the next lower level 206 that the top level bit represents, is turned on, then that top level bit is also turned on.

When a delete of a bucket happens, its corresponding sub bitmap may be materialized if it does not already exist and its bit marked 1. Then the pointer at RobbLvl3 204 is set if the sub bitmap did not exist before and the step is repeated for the levels above them. When a query via a rid index (record-based index) wants to check if the bucket it is trying to access is deleted, it accesses the topmost level. If the bit corresponding to the bucket at the top most level is off, it indicates the bucket is definitely not deleted and thus the query can proceed ahead. A scheme like this may be ideal if the probability of a block being deleted is low, which happens in most real situations. It is to be noted that the level may likely be in a register and thus may be very fast to access if most of them return not deleted. If the register has a 1 for that bucket, then it would mean that there exists a probability of the bucket being deleted but not certain unless the lower levels are checked. In such a case, the method and system of the present disclosure in one embodiment may access the lower levels iteratively until it hits the lowest level and gets a confirmation for the bucket or at some level it determines that the bucket is not deleted.

As the background index cleaners do their job and update the rid index cleaned of a particular bucket, such cleaners or the like will delete the reference of that bucket from the hierarchical bitmap. Thus at any point in time, the hierarchical bitmap may represent the state of buckets which have been deleted but their entries from the indexes have not been cleaned.

Deletes are generally in two states. For instance, deletes start out in uncommitted state when the delete happens but it has not been committed. All buckets belonging to this delete may be represented in one hierarchical bitmap. There may be one such bitmap for all buckets deleted but not committed for a unit of work. The bitmap may be entirely discarded if the transactions containing the deletes are rolled back. In the event it is committed, the hierarchical bitmap may be merged into a master hierarchical bitmap, which represents all blocks, which have been deleted and committed for this table. The background index cleaners may be operating on the deleted committed buckets only.

The merge of the bitmaps may be done at commit time without taking additional resources like memory. A failure of memory allocation at commit or more importantly at rollback time may be critical and thus in one embodiment, additional memory allocation is avoided. The method of the present disclosure in one embodiment does not take additional resources like memory at commit time, by proper memory allocation and management at the sub bitmap materialization and merge times. In one embodiment, needed memory for the bitmaps may be allocated during the processing of the deletes and at the time of the merge during a commit, reuse part of the runtime bitmap to make the master hierarchical bitmap. Thus in one embodiment, extra memory may not be needed during the merge of the bitmaps.

To merge a temporary bitmap into the master bitmap in one embodiment, first consider if a master bitmap already exists. If it does not, then make the temporary bitmap the new master bitmap, and there is nothing more to do. If a master bitmap already exists, then perform the following steps:

1. The new level 1 bitmap is replaced with the bitwise OR of the old master level 1 bitmap and the temporary level 1 bitmap.
2. For each level that includes a bitmap and corresponding pointers to lower level sub bitmaps, the bitmap is replaced with the bitwise OR of the old master bitmap at that level and the temporary bitmap at that level. For each pointer in the master bitmap's list of pointers, if the pointer is not null and the corresponding pointer in the temporary list is null, the point is not changed. If the pointer is null, the corresponding pointer is copied from the temporary bitmap to the master bitmap, and the lower level sub bitmap that it points to will belong to the master bitmap, from then on. If both the pointer in the master bitmap and the corresponding pointer in the temporary bitmap are not null, then the lower level sub bitmap is merged, either as in this step 2 (if it is also a combination of a bitmap and corresponding list of pointers) or as in step 3 (if it is the lowest level sub bitmap, including only bits and no pointers).
3. Each sub bitmap in the master for which a corresponding sub bitmap also exists in the temporary bitmap, as determined in step 2, is merged by bitwise ORing the two sub bitmaps, thus replacing the contents of the master sub bitmap with the result, and discarding the temporary sub bitmap, and for example, freeing the memory it occupies.

When a system crashes with a hierarchical bitmap in memory, the system restart may be enabled to recreate the hierarchical bitmap from on disk data structures. The bitmaps represent the buckets, which have been deleted but not cleaned up by the background index cleaners. The method also may provide an ability to subtract a hierarchical bitmap from another, which is very useful to remove the impact of a delete when it is to be discarded.

Figure 3:
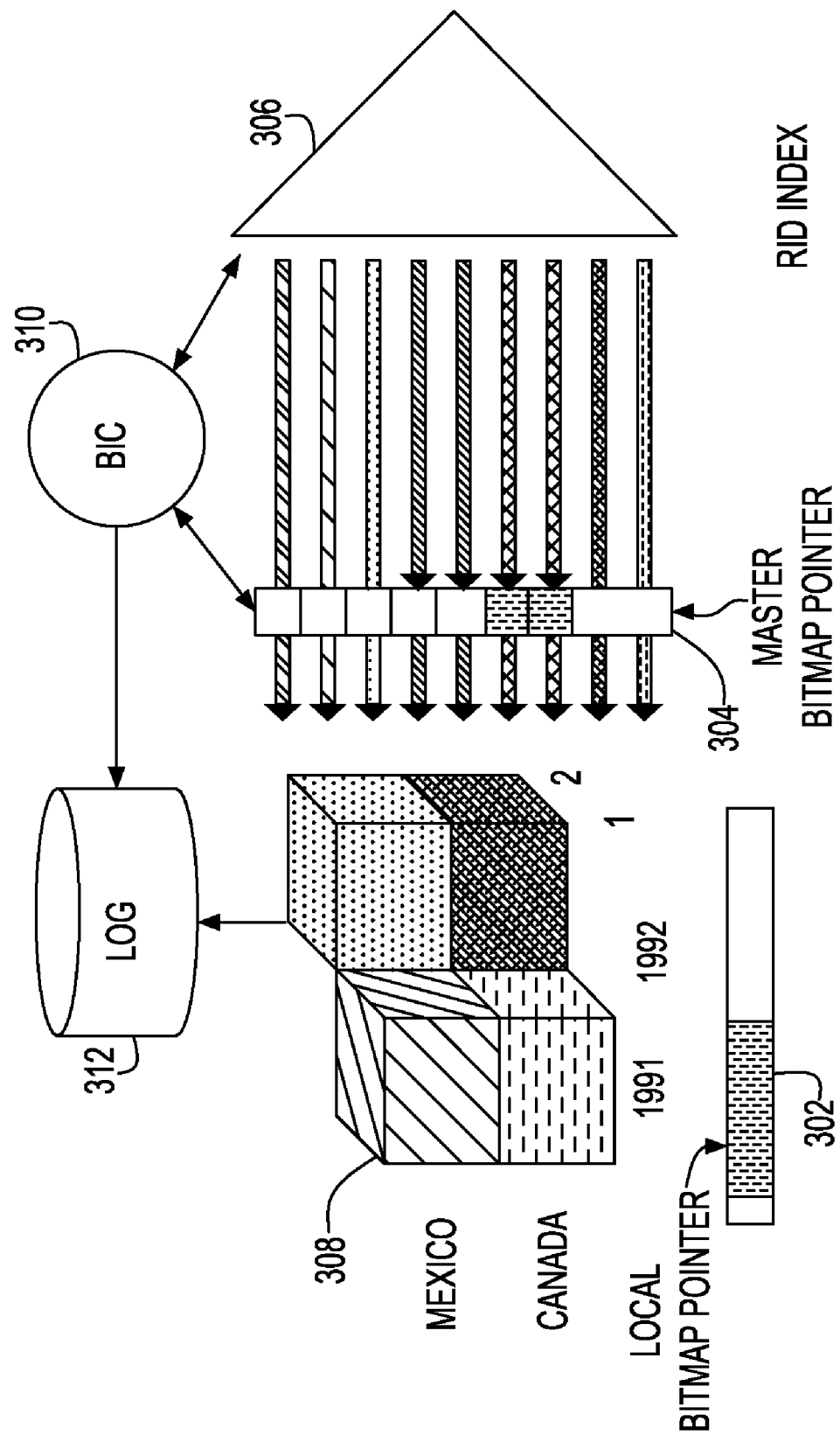
FIG. 3 illustrates a rollout scenario using hierarchical bitmaps in one embodiment of the present disclosure.

FIG. 3 illustrates a rollout scenario using hierarchical bitmaps in one embodiment of the present disclosure. FIG. 3 shows data is being accessed via a rid index 306. When a rollout happens and has not yet committed, the changes to the table data 308 is logged and a Local Hierarchical Bitmap representation 302 of the bucket is created. These are used to filter out record access using the rid index for only those, which originate from the application, which did the rollout. All other applications are free to access data on which the rollout application or any others does not have a lock.

When the rollout commits, this local bitmap 302 becomes the master bitmap 304 and now acts as a filter for everybody including the rollout application. The rollout application could simultaneously release any locks on the deleted/rolled out data it owned. At this point the index cleaners 310 such as a background index cleaner (BIC) may start cleaning up the deleted entries from the rid indexes and may log at 312 what it does and may also reset the master bitmap entries for the buckets it cleans up.

During this time another rollout may be submitted by some application, which deletes some additional buckets. A local bitmap may be created representing those buckets. All queries from the same application as this rollout filter out bucket accessed from master and the local. All queries from other applications may filter out bucket accessed from master only and may access data it can get access to otherwise. When this rollout commits, the local bitmap is merged with the master and at that stage all applications access data using the master bitmap as a filter. This process may continue until the index cleaners have cleaned up the indexes and cleared the master bitmap. Thus, in one embodiment, throughout the process, a local bitmap and master bitmap may be generated and cleared, as entries are deleted, committed and cleaners clean the indexes associated with the deleted entries.

The operations which are supported on the bitmaps may include, but not limited to: populating the hierarchical bitmap; probing the hierarchical bitmap; clearing the representation of a bucket in the hierarchical bitmap; merging two hierarchical bitmaps; subtracting one hierarchical bitmap from the next; recreating a hierarchical bitmap of buckets which have been deleted but not cleaned from on disk information after a crash; and determining the sizes of the various bitmaps of the hierarchical bitmap based on the machine architecture (register, cache sizes) and the maximum size of the table possible in terms of the buckets.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for utilizing a hierarchical bitmap structure to represent deleted data in databases, comprising:

allocating by a processor a first level bitmap having size equal to a register on a processor, each bit in the first level bitmap representing a plurality of blocks of data in a database;

allocating by a processor a second level bitmap, said each bit in the first level bitmap corresponding to a plurality of bits in the second level bitmap;

allocating by a processor one or more pointers corresponding to said plurality of bits in the second level bitmap, said one or more pointers being allocated to point to a sub bitmap generated after a data block is deleted but before the index corresponding to the data block is cleaned;

each of the levels in the hierarchical bitmap structure being of size which fits in a corresponding level of memory hierarchy associated with a machine running the processor; and each bit in the first level bitmap representing x/n blocks of data, wherein x is total number of blocks and n is the size of the first level bitmap, and wherein m number of sub bitmaps can be generated, each sub bitmap size equal to round((x/m)+0.5) bits;

allocating a temporary hierarchical bitmap structure corresponding to one or more local data deletes; and merging the temporary hierarchical bitmap structure with a master hierarchical bitmap structure.

2. The method of claim 1, wherein a bit in the first level bitmap is turned on if any one of the plurality of blocks of data the bit represents is deleted.

3. The method of claim 1, further including:

querying whether a data block was deleted by determining whether a bit in the first level bitmap that represents the data block is turned on, and if the bit is not turned on, determining that the data block is not deleted;

in response to the bit in the first level bitmap that represents the data block being turned on, evaluating a bit in the second level bitmap that represents the data block;

in response to the bit in the second level bitmap not being turned on, determining that the data block is not deleted;

in response to the bit in the second level bitmap that represents the data block being turned on, repeating the evaluating step with a next level bitmap if the next level bitmap exists;

evaluating whether a pointer corresponding to a sub bitmap that represents the data block exists;

in response to the pointer corresponding to a sub bitmap that represents the data block not existing, determining that the data block is not deleted;

in response to the sub bitmap that represents the data block existing, determining whether a bit in the sub bitmap that represents the data block is turned on;

in response to the bit in the sub bitmap that represents the data block being turned on, determining that the data block is not deleted; and in response to the bit in the sub bitmap that represents the data block not being turned on, determining that the data block is deleted.

4. The method of claim 1, wherein size of the second level bitmap corresponds to size of data cache in a machine the hierarchical bitmap structure is implemented.

5. A system for utilizing a hierarchical bitmap structure to represent deleted data in databases, comprising:

a plurality of bitmaps arranged in a hierarchy, each level of bitmaps in the hierarchy including a plurality of bits corresponding to one or more blocks of data, a level of bitmap in the hierarchy having bits representing a finer granularity of number of blocks than bits in its parent level, top most bitmap level having size that corresponds to size of a register of a machine in which the hierarchical bitmap structure is implemented; and a processor operable to generate a sub bitmap when a data block is deleted that corresponds to the sub bitmap, the processor further operable to turn on a bit corresponding to the data block in said each level of bitmaps, the processor further operable to query whether a second data block is deleted by evaluating a bit representing said second data block in one or more levels of bitmaps;

each of the levels in the hierarchical bitmap structure being of size which fits in a corresponding level of memory hierarchy associated with a machine running the processor; and each bit in the top most bitmap represents x/n blocks of data, wherein x is total number of blocks and n is the size of the top most bitmap, and wherein m number of sub bitmaps can be generated, each sub bitmap having size equal to round((x/m)+0.5) bits;

allocating a temporary hierarchical bitmap structure corresponding to one or more local data deletes; and merging the temporary hierarchical bitmap structure with a master hierarchical bitmap structure.

6. A method for utilizing a hierarchical bitmap structure to represent deleted data in databases, comprising:

allocating by a processor a first level bitmap having size equal to a register on a processor, each bit in the first level bitmap representing a plurality of blocks of data in a database;

allocating by a processor one or more pointers corresponding to said plurality of bits in the first level bitmap, said one or more pointers being allocated to point to a sub bitmap generated after a data block is deleted but before the index corresponding to the data block is cleaned;

each of the levels in the hierarchical bitmap structure being of size which fits in a corresponding level of memory hierarchy associated with a machine running the processor; and each bit in the first level bitmap representing x/n blocks of data, wherein x is total number of blocks and n is the size of the first level bitmap, and wherein m number of sub bitmaps can be generated, each sub bitmap having size equal to round((x/m)+0.5) bits;

allocating a temporary hierarchical bitmap structure corresponding to one or more local data deletes; and merging the temporary hierarchical bitmap structure with a master hierarchical bitmap structure.

* * * * *